United States Patent [19]

Stewart

[11] Patent Number: 4,648,134
[45] Date of Patent: Mar. 3, 1987

[54] OPTICAL RECEIVERS

[75] Inventor: William J. Stewart, Oxfordshire, England

[73] Assignee: Plessey Overseas Limited, Ilford, England

[21] Appl. No.: 652,737

[22] Filed: Sep. 21, 1984

[30] Foreign Application Priority Data

Sep. 23, 1983 [GB] United Kingdom ............... 8325552
Nov. 23, 1983 [GB] United Kingdom ............... 8331299

[51] Int. Cl.$^4$ ............................................. H04B 9/00
[52] U.S. Cl. ................................. 455/619; 455/608
[58] Field of Search ................. 350/96.13, 96.14; 455/608, 619, 606, 607, 617; 375/52, 82, 83, 91

[56] References Cited

U.S. PATENT DOCUMENTS 3,320,013 5/1967 Johnson ........................... 350/96.13
3,353,896 11/1967 Blattner ............................... 455/611

OTHER PUBLICATIONS

Philipp et al.-"Costas Loop Experiment"—IEEE Trans. on Comm., vol. COM 31, No. 8, Aug. 1983, pp. 1000-1002.
Favre-"Progress Towards Heterodyne"—IEEE Jour. on Quantum Elec., vol. QE-17, No. 6, Jun. 1981, pp. 897-905.
Cross-Optically Controlled Two Channel Integrated Optical Switch, IEEE Jour. of Quantum Elec.-vol. QE 14, No. 8, Aug. 1978, pp. 577-580.

Primary Examiner—Joseph A. Orsino, Jr.
Attorney, Agent, or Firm—Fleit, Jacobson, Cohn & Price

[57] ABSTRACT

An optical receiver comprises a local oscillator which produces an output signal having a frequency which differs by a predetermined amount from the frequency of an incoming phase-modulated coherent light signal having a "1" and "0" signal bits, mixing means for mixing the local oscillator output with the incoming signal and switching means effective for switching the mixed signal to respective detectors and the mixed signal frequency whereby the major proportion of the power content of the mixed signal during a "1" bit period is fed to one of the detectors and the major proportion of the power content of the mixed signal during a "0" bit period of the mixed signal is fed to the other detector.

In an alternative arrangement the output from the local oscillator is phase-modulated at the intermediate frequency before the mixing operation.

7 Claims, 5 Drawing Figures

OPTICAL RECEIVERS

BACKGROUND

This invention relates to optical receivers for detecting coherent light signals comprising phase modulated (key-shifted) carrier signals. It is well known for such optical receivers to include a local oscillator the output signal from which is mixed with an incoming modulated coherent light signal to enhance the receiver sensitivity.

In the case of homodyne optical receivers the output from the local oscillator has a frequency which is the same as that of the incoming coherent light signal whereas in the case of heterodyne optical receivers the frequency of the local oscillator differs from that of the coherent light signal by an amount greater than the maximum modulation rate.

Since homodyne receivers require the local oscillator and incoming coherent light signal frequencies to be identical, the phase of the local oscillator needs to be closely controlled with respect to the incoming coherent light signal which in turn necessitates a more complex and costly local oscillator providing phase-locking facilities. However, the homodyne receiver does have greater sensitivity (e.g. 3 dB more sensitive) than the heterodyne receiver due to side-band elimination and moreover, it does not require the detector speed of response to be as high as the heterodyne receiver.

SUMMARY OF THE INVENTION

According to one aspect of the present invention there is provided an optical receiver comprising a local oscillator which produces an output signal having a frequency which differs by a predetermined amount from the frequency of an incoming phase-modulated coherent light signal having '1' and '0' signal bits, mixing means for mixing the local oscillator output with the incoming signal and switching means effective for switching the mixed signal to respective detectors at the mixed signal frequency whereby the major proportion of the power content of the mixed signal during a '1' bit period of said signal is fed to one of the detectors and the major proportion of the power content of the mixed signal during a '0' bit period of the mixed signal is fed to the other detector.

According to another aspect of the present invention there is provided an optical receiver comprising a local oscillator for producing an output signal the frequency of which differs by a predetermined amount from that of the frequency of an incoming phase-modulated coherent light signal having '1' and '0' signal bits, optical mixing and coupling means for mixing the incoming signal with the local oscillator output which is arranged to be phase modulated at the intermediate frequency by a phase modulator before mixing and for providing outputs to respective detectors whereby all or at least the major part of the output from the mixed signal is fed to one of the detectors during '1' signal bits of the incoming signal and to the other of the detectors during '0' signal bits of the incoming signal.

In carrying out the last-mentioned aspect of the present invention the phase modulating signal may be of rectangular waveform or it may be of saw-tooth waveform in which case all of the power content of the mixed signal will be applied to the respective detectors during the '1' and '0' bit periods of the incoming signal.

BRIEF DESCRIPTION OF THE DRAWINGS

By way of example three embodiments of the present invention will now be described with reference to the accompanying drawings in which.

DETAILED DESCRIPTION

Figure 1:
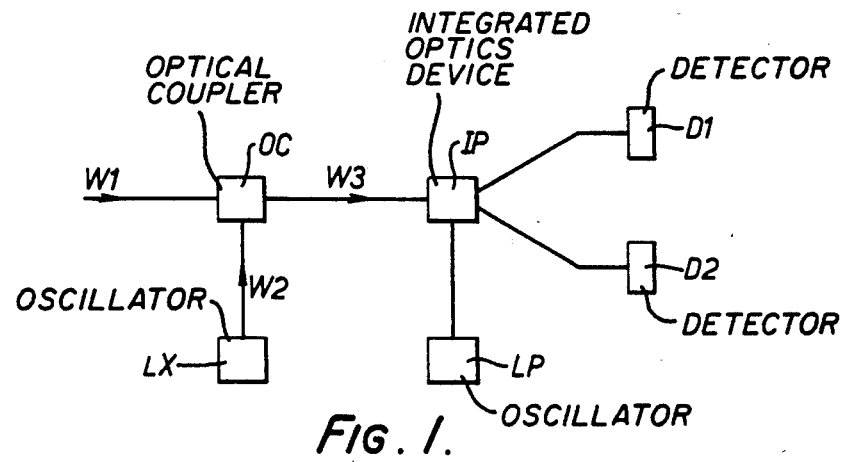
FIG. 1 shows a schematic diagram of one optical receiver using optical switching.

Referring to FIG. 1 the optical receiver illustrated is arranged to receive over an optical transmission path an input signal W1 comprising a phase-shifted coherent light signal consisting of a succession of phase-shifted '1' and '0' signal bits. This input signal W1 is mixed with an output signal W2 from a local oscillator LX (e.g. laser). The mixing of the signals W1 and W2 may be accomplished by means of a beam combiner or optical coupler OC.

A further oscillator LP is synchronised or frequency locked with the intermediate frequency signal derived from the mixer OC and the output from the oscillator LP is applied to an integrated optics device IP which receives the mixed signal W3. By this arrangement optical switching of the signal W3 at intermediate frequency between two detectors D1 and D2 is accomplished.

Due to the keyed phase shifts between '1' and '0' bits of the input signal, the optical switching of the signal W3 will cause one of the detectors (e.g. detector D1) to produce a relatively high power output whilst the other detector (e.g. detector D2) will produce a low output in response to '1' bits and these respective power outputs for the detectors D1 and D2 will be reversed during the occurrence of '0' bits.

Figure 2:
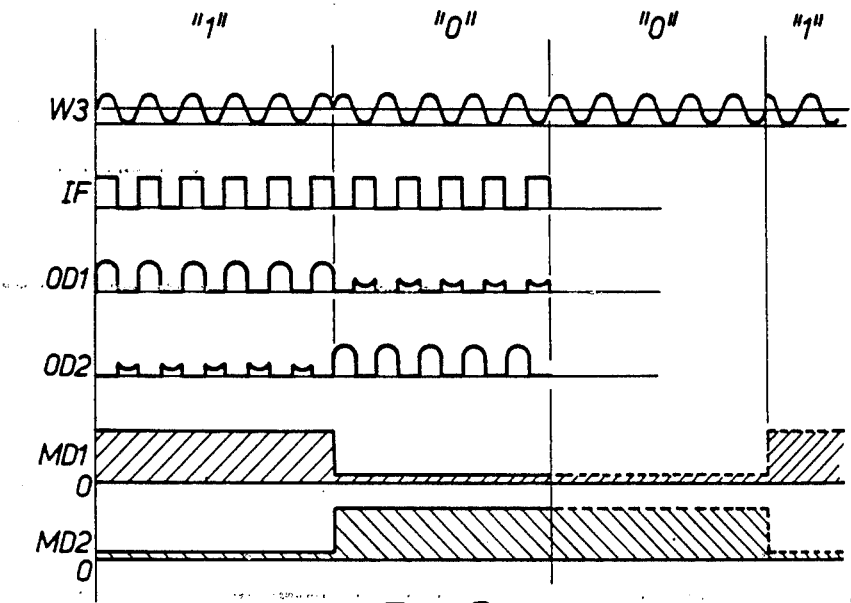
FIG. 2 shows a pulse diagram for the FIG. 1 receiver.

Referring to FIG. 2 the keyed phase shifted signal W3 is shown in respect of signal bits 1001. The intermediate frequency signal output IF produced by the oscillator LP is shown directly below the signal W3 and this signal switches the output between the detectors D1 and D2. Thus, as can be seen from FIG. 2, during the first '1' bit period the output from the detector D1 is high whereas that from detector D2 is low. When the signal W3 is phase shifted upon the occurrence of the '0' bit the output OD1 from the detector D1 will become relatively low whereas the output OD2 from the detector D2 will become high. The resultant mean signal outputs from the detectors D1 and D2 are shown at MD1 and MD2 so that the overall effect of the arrangement described is similar to the previously mentioned homodyne arrangement and allows low speed detectors D1 and D2 having a response speed corresponding to the bit rate of the input signal W1 to be used.

Figure 3:
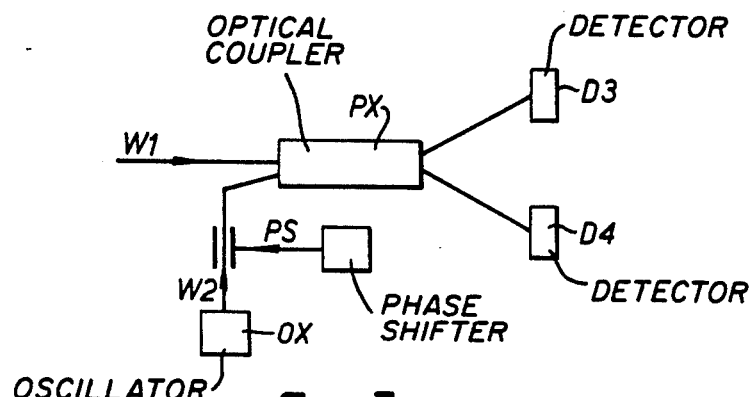
FIG. 3 shows a schematic diagram of an optical receiver using phase switching.
Figure 4:
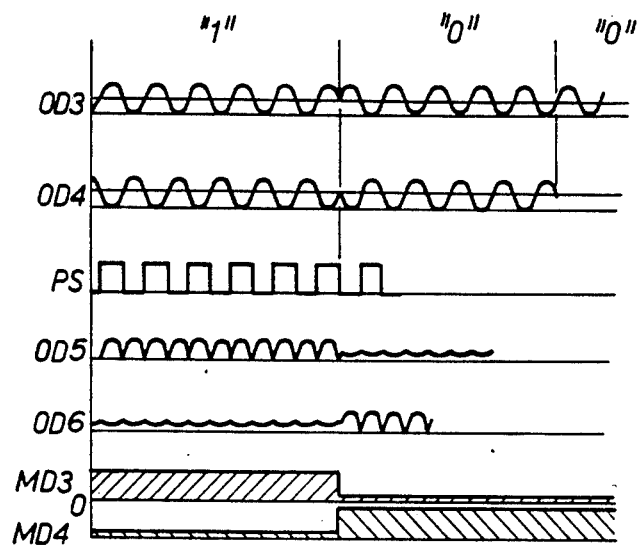
FIG. 4 shows one pulse diagram for the FIG. 2 receiver.

Referring now to FIG. 3 of the drawings, this shows an alternative embodiment to that shown in FIG. 1. In this embodiment the keyed phase shifted optical input signal W1 and output signal W2 from an oscillator OX are fed to the respective inputs of a four-port optical coupler PX. As shown, the outputs from the coupler PX are fed to detectors D3 and D4 which produce the detector outputs OD3 and OD4 which outputs are at intermediate frequency and in anti-phase. However, if the oscillator output signal W2 is phase shifted or modulated by a square wave phase shifter signal PS synchronised at the intermediate frequency then the detector outputs will be as shown at OD5 and OD6. As will be seen from the drawing in this embodiment a relatively high output OD5 will be derived from detector D3 (mean output MD3) and a low output OD6 (mean output MD4) will be derived from detector D4 during '1' bits but during '0' bits the detector D3 output will be relatively low whereas that of detector D4 will be high.

Figure 5:
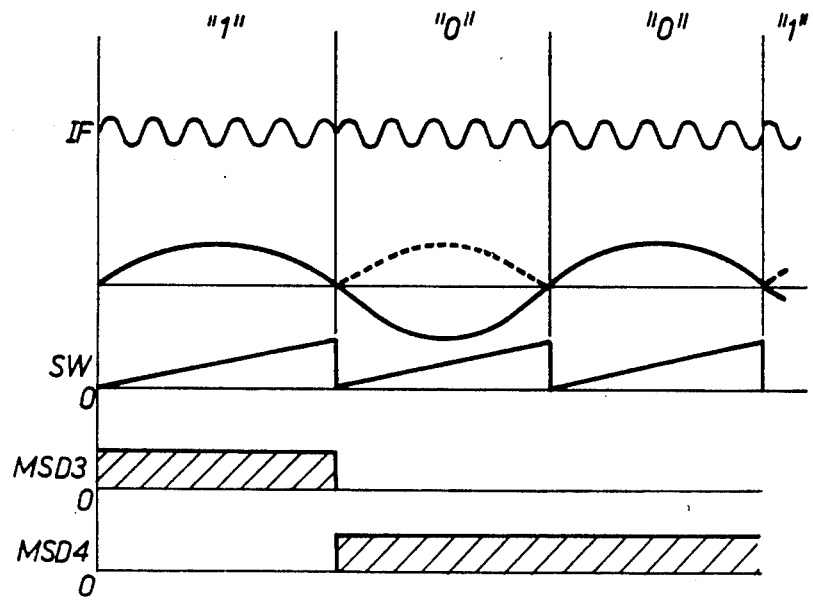
FIG. 5 shows another pulse diagram for a modified form of the receiver shown in FIG. 3 producing serrodyne operation.

In yet another embodiment of the invention so-called serrodyne operation is achieved by arranging that the phase modulating signal for the oscillator output W2 has a sawtooth waveform SW which produces a phase shift ($2\pi$) in the oscillator signal output during each period of the IF (W1−W2) the period of the intermediate frequency IF (i.e., the difference frequency between the incoming signal W1 and the oscillator signal W2). The effect of this, as can be seen from FIG. 5 is to cause all of the power to be switched totally to one or other of the detectors D3 and D4 according to whether the signal bit is '1' or '0'. Thus in this embodiment there is no residual power in one of the detectors as in the arrangements shown in FIGS. 1 and 3. The mean power outputs from the detectors are shown at MSD3 and MSD4.

I claim:

1. An optical receiver comprising a local oscillator which produces an output signal having a frequency which differs by a predetermined amount from the frequency of an incoming phase-modulated coherent light signal having "1" and "0" signal bits, mixing means for mixing the local oscillator output with the said incoming signal to provide a mixed signal having a mixed signal frequency and switching means effective for switching the mixed signal received from the mixing means to respective detectors at the mixed signal frequency whereby the major proportion of the power content of the mixed signal during a "1" bit period of said mixed signal is fed to one of the detectors and the major proportion of the power content of the mixed signal during a "0" bit period of the mixed signal is fed to the other detector.

2. An optical receiver as claimed in claim 1, in which the mixing means comprises a beam combiner or optical coupler.

3. An optical receiver as claimed in claim 1, in which the switching means comprises an integrated optics device arranged to be switched by the output of an oscillator which is synchronised or frequency locked with the mixed signal frequency of the mixing means.

4. An optical receiver comprising a local oscillator for producing an output signal the frequency of which differs by a predetermined amount from that of the frequency of an incoming phase-modulated coherent light signal having "1" and "0" signal bits, optical mixing and coupling means for mixing the incoming signal with the local oscillator output to provide a mixed signal at a mixed signal frequency or an intermediate frequency and the local oscillator output being phademodulated at the intermediate frequency by a phase modulator before mixing, outputs from the optical mixing and coupling means being fed to respective detectors whereby all or at least the major part of the output based upon the mixed signal is fed to one of the detectors during "1" signal bits of the incoming signal and to the other of the detectors during "0" signal bits of the incoming signals.

5. An optical receiver as claimed in claim 4, in which the phase modulator provides a phase-modulating signal of rectangular waveform.

6. An optical receiver as claimed in claim 4, in which the phase-modulator provides an output of saw-tooth waveform whereby all of the power content of the mixed signal will be applied to the respective detectors during the "1" and "0" bit periods of the incoming signal.

7. An optical receiver comprising a local oscillator for producing an output signal the frequency of which differs by a predetermined amount from that of the frequency of an incoming phase-modulated coherent light signal having "1" and "0" signal bits, optical mixing and coupling means for mixing the incoming signal with the local oscillator output to provide a mixed signal at a mixed signal frequency or an intermediate frequency and the local oscillator output being phase-modulated at the intermediate frequency by a phase-modulator before mixing, outputs from the optical mixing and coupling means being fed to respective detectors whereby all or at least the major part of the output based upon the mixed signal is fed to one of the detectors during "1" signal bits of the incoming signal and to the other of the detectors during "0" signal bits of the incoming signals and the phase-modulator provides an output of saw-tooth waveform whereby all of the power content of the mixed signal is applied to the respective detectors during the "1" and "0" bit periods of the incoming signal.

* * * * *